(12) United States Patent
Maeda et al.

(10) Patent No.: US 10,541,084 B2
(45) Date of Patent: *Jan. 21, 2020

(54) FILM CAPACITOR AND CONNECTION TYPE CAPACITOR, INVERTER, AND ELECTRIC-POWERED VEHICLE

(71) Applicant: KYOCERA Corporation, Kyoto-shi, Kyoto (JP)

(72) Inventors: Kazutaka Maeda, Koriyama (JP); Wataru Kato, Daito (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,868

(22) Filed: Nov. 13, 2018

(65) Prior Publication Data

US 2019/0164692 A1 May 30, 2019

Related U.S. Application Data

(63) Continuation of application No. 15/121,060, filed as application No. PCT/JP2015/056214 on Mar. 3, 2015, now Pat. No. 10,147,542.

(30) Foreign Application Priority Data

Mar. 3, 2014 (JP) .................................. 2014-040553

(51) Int. Cl.
*H01G 4/18* (2006.01)
*H01G 4/32* (2006.01)
(Continued)

(52) U.S. Cl.
CPC ................. *H01G 4/18* (2013.01); *B60K 6/28* (2013.01); *B60L 50/51* (2019.02); *H01G 4/005* (2013.01);
(Continued)

(58) Field of Classification Search
CPC .................................. H01G 4/18; H01G 4/14
See application file for complete search history.

(56) References Cited

U.S. PATENT DOCUMENTS

2004/0230847 A1    11/2004   Patwardhan
2009/0148716 A1    6/2009    Stadlbauer
(Continued)

FOREIGN PATENT DOCUMENTS

JP          54-113061 A       9/1979
JP         2002-289461 A     10/2001
(Continued)

OTHER PUBLICATIONS

Japanese Office Action with English concise explanation, Japanese Patent Application No. 2016-506501, dated Mar. 20, 2018, 4 pages.

(Continued)

*Primary Examiner* — Eric W Thomas
(74) *Attorney, Agent, or Firm* — Volpe and Koenig, P.C.

(57) ABSTRACT

There is a film capacitor capable of suppressing decrease in the electrostatic capacitance even after a self-healing phenomenon has occurred. A film capacitor includes a dielectric film; and an electrode film disposed on a principal surface of the dielectric film, the dielectric film containing an organic resin and an organic component having a higher volatility than the organic resin. The organic resin is preferably any one of a cyclic olefin-based resin, a polyarylate resin, a polyphenylene ether resin and a polyetherimide resin. The organic component is preferably at least one selected from the group consisting of cyclohexane, ethylcyclohexane, toluene, xylene, chloroform, and tetrahydrofuran.

9 Claims, 6 Drawing Sheets

(51) Int. Cl.
| | |
|---|---|
| *H01G 4/20* | (2006.01) |
| *H02M 7/00* | (2006.01) |
| *B60L 50/51* | (2019.01) |
| *B60K 6/28* | (2007.10) |
| *H01G 4/005* | (2006.01) |
| *H01G 4/04* | (2006.01) |
| *H01G 4/33* | (2006.01) |
| *H01G 4/38* | (2006.01) |
| *H02M 7/5387* | (2007.01) |
| *H02P 27/06* | (2006.01) |

(52) U.S. Cl.
CPC ............... *H01G 4/04* (2013.01); *H01G 4/20* (2013.01); *H01G 4/32* (2013.01); *H01G 4/33* (2013.01); *H01G 4/38* (2013.01); *H02M 7/003* (2013.01); *H02M 7/5387* (2013.01); *H02P 27/06* (2013.01); *Y02T 10/7022* (2013.01); *Y10S 903/907* (2013.01)

(56) References Cited

U.S. PATENT DOCUMENTS

| | | |
|---|---|---|
| 2009/0281224 A1 | 11/2009 | Koh et al. |
| 2012/0081833 A1* | 4/2012 | Cao .............. C08G 73/1042 361/301.5 |
| 2014/0355173 A1 | 12/2014 | Odle |

FOREIGN PATENT DOCUMENTS

| | | |
|---|---|---|
| JP | 2008-034189 A | 2/2008 |
| JP | 2008-078168 A | 4/2008 |
| JP | 2009117601 A | 5/2009 |

OTHER PUBLICATIONS

International Search Report, PCT/JP2015/056214, dated May 19, 2015, 2 pages.

* cited by examiner

FILM CAPACITOR AND CONNECTION TYPE CAPACITOR, INVERTER, AND ELECTRIC-POWERED VEHICLE

CROSS REFERENCE TO RELATED APPLICATIONS

This application is a continuation application of U.S. patent application Ser. No. 15/121,060, filed Aug. 24, 2016, and claims the benefit of PCT/JP2015/056214, filed Mar. 3, 2015 and JP 2014-040553, filed Mar. 3, 2014, which are incorporated by reference as if fully set forth.

TECHNICAL FIELD

The present invention relates to a film capacitor and a connection type capacitor and to an inverter and an electric-powered vehicle employing the same.

BACKGROUND ART

A film capacitor is fabricated by using a metallized film obtained such that metal such as aluminum is vapor-deposited onto both principal surfaces of a dielectric film so that electrode films are formed. Then, dielectric breakdown can be suppressed by virtue of a self-healing phenomenon specific to electrode films and hence such a film capacitor is widely used in a related art. Here, the self-healing phenomenon is such a phenomenon that when short circuit is to occur in an electrical insulation defect portion of a dielectric film, the electrode film in the periphery of the defect portion evaporates and scatters owing to the energy of the short circuit so that the short circuit is avoided in the electrical insulation defect portion in the dielectric film and thereby the function of the capacitor is restored.

In this case, usually, the dielectric film is fabricated by a stretching method in which an organic resin not containing a solvent is mechanically stretched so that a film is formed. Thus, polypropylene (PP), polyethylene terephthalate (PET), or the like is selected as an organic resin suitable for this forming method.

CITATION LIST

Patent Literature

Patent Literature 1: Japanese Unexamined Patent Publication JP-A 2008-78168

SUMMARY OF INVENTION

Technical Problem

Nevertheless, in the dielectric film of the related art, there has been a problem that in the electrode film where the self-healing phenomenon has occurred, the area of the portion where the metallic component has evaporated and scattered is large and hence large decrease is caused in the electrostatic capacitance of the film capacitor.

The invention has been devised in view of the above-mentioned problem, and an object thereof is to provide a film capacitor and a connection type capacitor capable of suppressing decrease in the electrostatic capacitance even after a self-healing phenomenon has occurred; and an inverter and an electric-powered vehicle employing the same.

Solution to Problem

A film capacitor according to an embodiment of the invention includes a dielectric film; and a an electrode film disposed on a principal surface of the dielectric film, the dielectric film containing an organic resin and an organic component having a higher volatility than the organic resin.

A connection type capacitor according to an embodiment of the invention includes a plurality of the film capacitors described above; and a bus bar connecting the plurality of the film capacitors.

An inverter according to an embodiment of the invention includes a bridge circuit composed of switching elements; and a capacitor part connected to the bridge circuit, the capacitor part being composed of the film capacitor or the connection type capacitor described above.

An electric-powered vehicle according to an embodiment of the invention includes a power supply; an inverter connected to the power supply; a motor connected to the inverter; and wheels driven by the motor, the inverter being composed of the inverter described above.

Advantageous Effects of Invention

According to the invention, even after a self-healing phenomenon has occurred, decrease in the electrostatic capacitance can be suppressed.

DESCRIPTION OF EMBODIMENTS

Figure 1A:
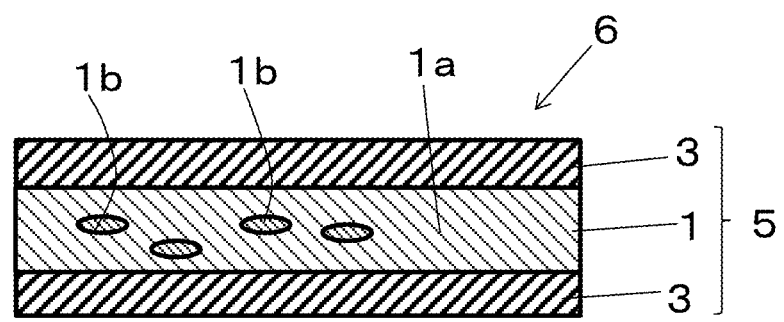
FIG. 1A is a sectional view schematically showing a structure that principal surfaces of a dielectric film are each provided with an electrode film.
Figure 1B:
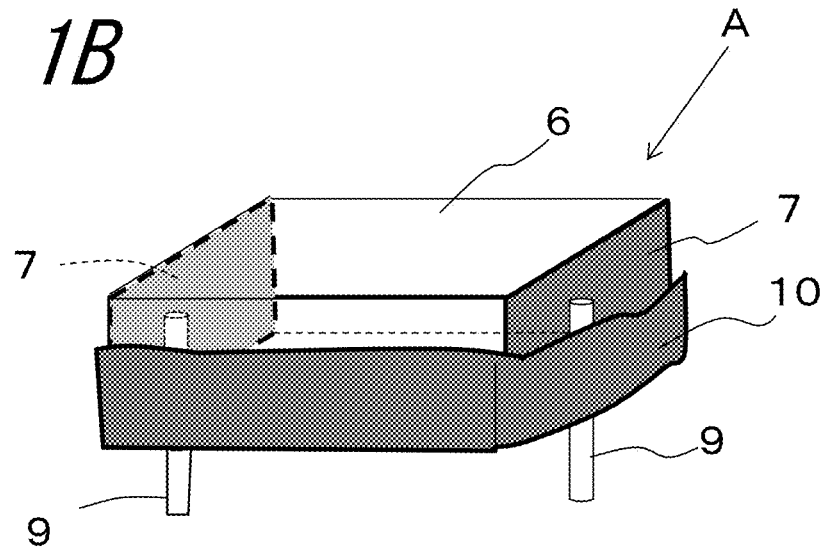
FIG. 1B is an external appearance perspective view schematically showing the configuration of a first embodiment of a film capacitor.

FIG. 1A is a sectional view schematically showing a structure that principal surfaces of a dielectric film are each provided with an electrode film, and FIG. 1B is an external appearance perspective view schematically showing the configuration of a first embodiment of a film capacitor.

A film capacitor A of the first embodiment shown in FIG. 1B includes, as a basic configuration, a body portion 6 in which metallized films 5 are laminated in a multilayered form, each of which includes a dielectric film 1 and an electrode film 3 disposed on each of principal surfaces of the dielectric film 1 as shown in FIG. 1A, and external electrodes attached to the body portion 6, and lead wires 9 are provided when necessary.

In this case, from the perspective of electrical insulation and resistance to environment, a part of the body portion 6, the external electrodes 7, and the lead wires 9 may be covered by an exterior member 10 when necessary.

Here, in the film capacitor A of the first embodiment, the dielectric film 1 contains an organic resin 1a and an organic component 1b having a higher volatility than the organic resin 1a.

According to the film capacitor A of the first embodiment, since the organic resin 1a constituting the dielectric film 1 contains the organic component 1b having a higher volatility, when dielectric breakdown occurs locally in the dielectric film 1, the organic component 1b contained in the dielectric film 1 volatilizes owing to the heat generated in association with the dielectric breakdown so that the rate of scattering of the electrode films 3 can be increased. As such, when a portion where insulation is degraded is formed in the dielectric film 1, it is possible to reduce the time necessary for transition from a normal state where the principal surface of the dielectric film 1 is provided with the electrode film 3 to a state where the electrode films 3 are partly lost. Thus, it is possible to avoid a situation that a voltage is applied for a long time onto the portion where the insulation of the dielectric film 1 has been degraded. By virtue of this, it is possible to reduce the area of damage in the dielectric film 1 and the electrode films 3. As a result, it is possible to suppress decrease in the electrostatic capacitance in a case where a self-healing phenomenon has occurred in the film capacitor A.

From this reason, the film capacitor A of the first embodiment has an excellent self-healing function. For example, in an evaluation of the self-healing function performed by repeating of voltage raising and lowering, such stable performance is achieved as the voltage raising and lowering is allowed to be repeated three times or more.

Here, the expression "to have a higher volatility than the organic resin 1a" indicates that, for example, when gas chromatography analysis is performed on the dielectric film 1, gasification occurs and is detected under a condition of lower energy or lower temperature than in the organic resin 1a.

As such, the organic component 1b contained in the dielectric film 1 can be detected by gas chromatography analysis. However, when a difference in the components from the organic resin 1a is to be clarified further, there may be employed a method of performing gas chromatography analysis on a dielectric film 1 having been vacuum-treated at a temperature near the room temperature for one to two days and then comparing the result with the result of gas chromatography analysis of a sample without vacuum treatment to perform judgment on the basis of the difference.

In the film capacitor A of the first embodiment, a cyclic olefin-based resin is preferable as the organic resin 1a used in the dielectric film 1. In such a cyclic olefin-based resin, the polarity is low and the withstand voltage characteristics are satisfactory. In addition, in comparison with a crystalline resin such as polypropylene (PP) and polyethylene terephthalate (PET), in such a case that dielectric breakdown is caused by a voltage applied on the dielectric film 1, the viscosity at the time of local melting can be low. Thus, the withstand voltage of the film capacitor can be increased to 650 V/μm or higher.

As the cyclic olefin-based resin, a ring-opening polymer of monomers having a norbornene ring or an addition copolymer of cyclic olefin is preferable. Among these, from the perspective of an especially high withstand voltage, the ring-opening polymer of monomers having a norbornene ring is more preferable.

Further, in place of the above-mentioned cyclic olefin-based resin, the dielectric film 1 in the first embodiment may similarly be applied to any one of a polyarylate-based resin, a polyphenylene ether-based resin, and a polyetherimide-based resin. When the dielectric film 1 employs the organic resin 1a composed of any one of the polyarylate-based resin, the polyphenylene ether-based resin, and the polyetherimide-based resin described here, the high-temperature load lifetime can be improved. Further, it is possible to reduce decrease in the electrostatic capacitance in a case where a direct-current voltage is applied on the film capacitor A (referred to as DC bias characteristics, in some cases hereinafter).

Here, the expression "-based" imparted to the cyclic olefin-based resin and the like indicates that each of the above-mentioned polymer compounds is contained as the main component in the dielectric film 1. The main component indicates a component having the largest volume ratio in the organic resin 1a contained in the dielectric film 1. Then, a criterion for the ratio is 60 volume % or larger.

As the organic component 1b, at least one selected from the group consisting of cyclohexane, ethylcyclohexane, toluene, xylene, chloroform, and tetrahydrofuran is preferable. This is because the polymer compounds such as the cyclic olefin-based resin, the polyarylate-based resin, the polyphenylene ether-based resin, and the polyetherimide-based resin can easily be dissolved in such an organic component 1b.

Further, when contained in the organic resin 1a, such an organic component 1b is easily confined in the organic resin 1a and hence a state of being firmly adhered to the organic resin 1a is easily achieved so that the organic component 1b can be held in the dielectric film 1 for a long term. As a result, it is possible to obtain the film capacitor A in which deterioration is suppressed and the characteristics are stable for a long term.

For each organic resin 1a described above, there is a suitable combination as the organic component 1b. For the cyclic olefin-based resin, any one of cyclohexane, ethylcyclohexane, toluene, xylene, and a mixture of cyclohexane and ethylcyclohexane is suitable. In this case, the withstand voltage of the dielectric film 1 can be increased.

For the polyarylate-based resin, any one of toluene, tetrahydrofuran, and n-methylpyrrolidone (NMP) is suitable. For the polyphenylene ether-based resin or the polyetherimide-based resin, chloroform is suitable. In these cases, the high-temperature load lifetime of the dielectric film 1 can be improved.

It is preferable that the boiling temperature (Tb) of the organic component 1b is lower than the glass transition temperature (Tg) of the organic resin 1a described above. For an example of the cyclic olefin-based resin, the glass transition temperature (Tg) of the cyclic olefin-based resin is 150 to 180° C. Then, it is suitable that the boiling temperature (Tb) of the organic component 1b to be employed is lower than the glass transition temperature (Tg) of the cyclic olefin-based resin by 10 to 120° C. or the like, and 60 to 170° C. is preferable. Also for the polyarylate-based resin, the polyphenylene ether-based resin, and the polyetherimide-based resin which are employable as the organic resin 1a other than the cyclic olefin-based resin, it is preferable that the temperature difference between the glass transition temperature (Tg) of the organic resin 1a and the boiling temperature (Tb) of the organic component falls within a similar range. Here, from the perspective of the long-lasting property of the organic component 1b in the organic resin 1a (the dielectric film 1), it is preferable that the organic component 1b has a higher boiling temperature (Tb).

Here, when the cyclic olefin-based resin, the polyphenylene ether-based resin, the polyetherimide-based resin, or the polyarylate-based resin is employed as the organic resin, it is preferable that the content of the organic component 1b contained in the dielectric film 1 is 0.01 to 7 mass %. When the content of the organic component 1b contained in the dielectric film 1 falls within the above-mentioned range, the decrease in the relative permittivity of the dielectric film 1 can be suppressed to 10% or smaller. Thus, the decrease in the electrostatic capacitance where the self-healing phenomenon has occurred can be reduced.

As the material of the electrode film 3 applied to the film capacitor A of the first embodiment, in place of the aluminum described above, zinc or an alloy containing these may preferably be employed. Further, as the material of the metalicon electrode, one of metallic material selected from aluminum, copper, and solder is preferable.

In the film capacitor of the first embodiment, the principal surface of the dielectric film 1 described above is provided with the electrode film 3. However, as long as this configuration is employed as the basic structure, two metallized films each of which one side alone of the dielectric film 1 is provided with the electrode film 3 may be stacked and wound together and employed and then an effect similar to that of the film capacitor A described above can be obtained.

Figure 2:
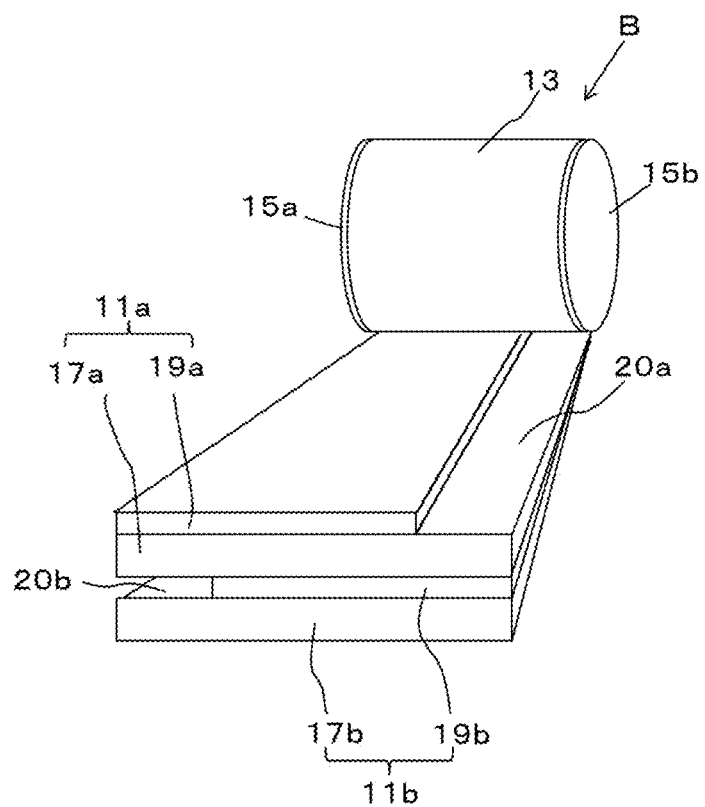
FIG. 2 is a development perspective view schematically showing the configuration of a second embodiment of a film capacitor.

FIG. 2 is a development perspective view schematically showing the configuration of a second embodiment of a film capacitor. In a film capacitor B of the second embodiment, metalicon electrodes serving as external electrodes 15a and 15b are provided on end faces opposite to each other in a body portion 13 constructed from metallized films 11a and 11b stacked and wound together. Here, in FIG. 2, for simplicity of understanding, the thicknesses of dielectric films 17a and 17b and electrode films 19a and 19b having been pulled out are drawn thicker on the near side of the plane of paper.

The metallized films 11a and 11b have a configuration that the electrode film 19a, 19b is provided with a principal surface of the dielectric film 17a, 17b. In this case, the electrode films 19a and 19b are formed so that a portion (an electrode film non-formed part 20a, 20b, in some cases hereinafter) in which the electrode film 19a, 19b is not formed and which serves as an exposed portion of the dielectric film 17a, 17b remains continuously in the longitudinal direction on one-end side of the width direction of the dielectric film 17a, 17b.

The metallized films 11a and 11b are disposed so that the electrode film non-formed parts 20a and 20b are located on the opposite sides of the width direction of the dielectric films 17a and 17b. Thus, the electrode films 19a and 19b are deviated from each other.

That is, in the film capacitor B, the metallized film 11a constituted by the dielectric film 17a and the electrode film 19a and the metallized film 11b constituted by the dielectric film 17b and the electrode film 19b are stacked and wound together as shown in FIG. 2.

Figure 3:
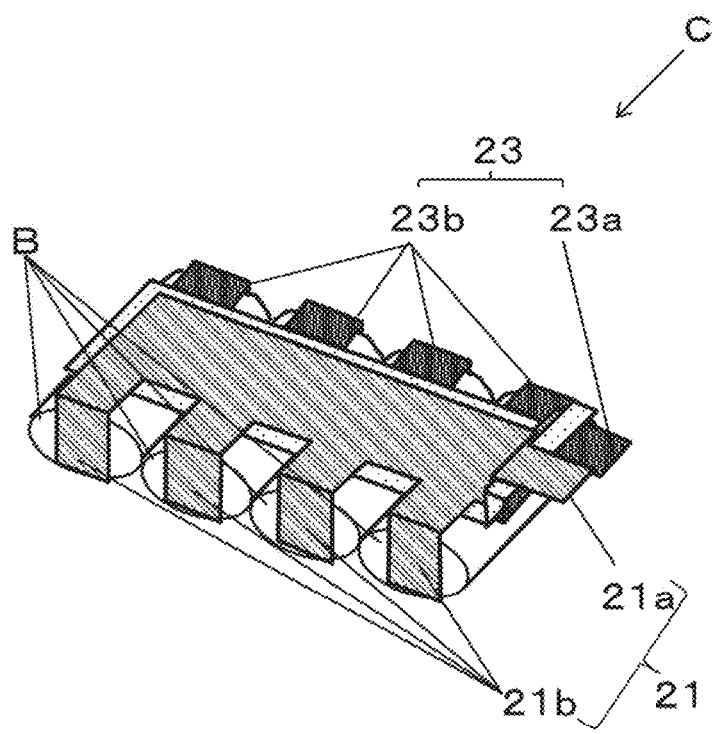
FIG. 3 is a perspective view schematically showing the configuration of an embodiment of a connection type capacitor.

FIG. 3 is a perspective view schematically showing the configuration of an embodiment of a connection type capacitor. In FIG. 3, for simplicity of understanding of the configuration, a case and molding resin are omitted in the illustration. A connection type capacitor C of the embodiment has a configuration that a plurality of film capacitors B are connected in parallel to each other by a pair of bus bars 21 and 23. The bus bars 21 and 23 include terminal parts 21a and 23a for external connection and extraction terminal parts 21b and 23b connected to the external electrodes 15a and 15b of the film capacitors B, respectively.

When the film capacitor B described above is applied to the connection type capacitor C, such a connection type capacitor C can be obtained that even after a self-healing phenomenon has occurred, decrease in the electrostatic capacitance can be suppressed.

Here, in the connection type capacitor C shown in FIG. 3, the film capacitors B have been disposed in the direction of major axis of the cross section. Instead, the film capacitors B may be stacked in the direction of minor axis of the cross section so that a similar effect can be obtained.

Figure 4:
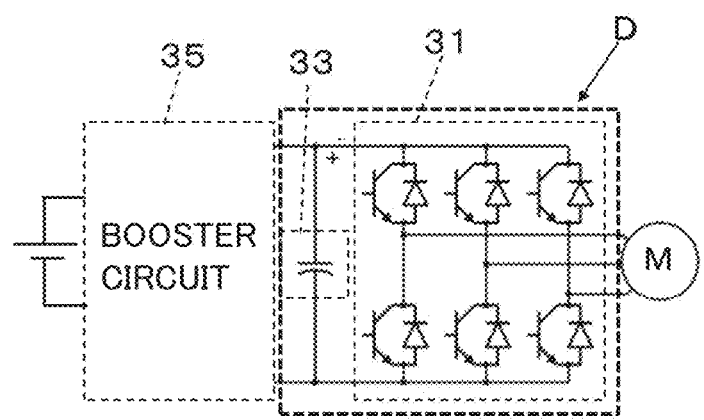
FIG. 4 is a schematic configuration diagram used for describing the configuration of an embodiment of an inverter.

FIG. 4 is a schematic configuration diagram for describing the configuration of an embodiment of an inverter. FIG. 4 shows an example of an inverter D which generate an alternating current from a direct current. As shown in FIG. 4, the inverter D of the embodiment includes a bridge circuit 31 composed of switching elements (such as IGBTs (Insulated gate Bipolar Transistors)) and diodes; and a capacitor part 33 disposed between input terminals of the bridge circuit 31 for voltage stabilization. Here, the film capacitor B or the connection type capacitor C described above is employed as the capacitor part 33.

Here, the inverter D is connected to a booster circuit 35 for boosting the voltage of a direct-current power supply. On the other hand, the bridge circuit 31 is connected to a motor generator (a motor M) serving as a driving source.

Figure 5:
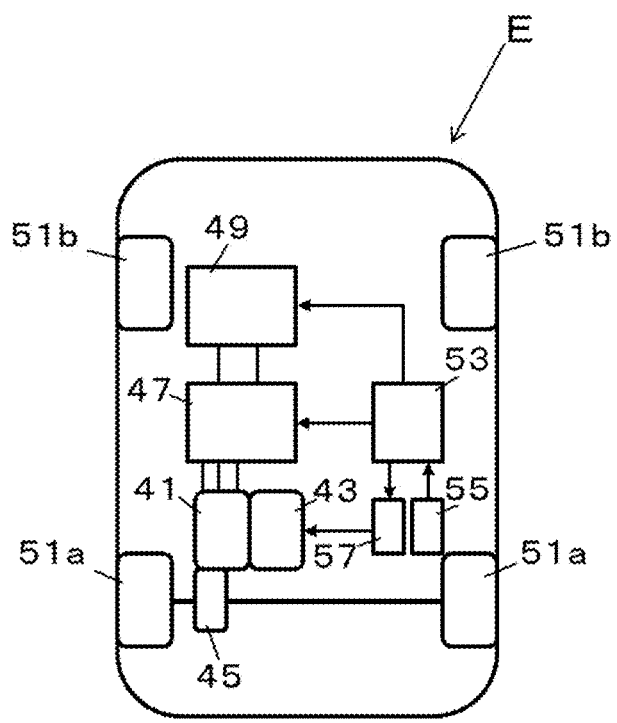
FIG. 5 is a schematic configuration diagram showing an embodiment of an electric-powered vehicle.

FIG. 5 is a schematic configuration diagram showing an embodiment of an electric-powered vehicle. FIG. 5 shows an example of a hybrid electric vehicle (HEV) serving as an electric-powered vehicle E.

In FIG. 5, reference numeral 41 indicates a motor for driving, reference numeral 43 indicates a combustion engine, reference numeral 45 indicates a transmission, reference numeral 47 indicates an inverter, reference numeral 49 indicates a power supply (a battery), reference numerals 51a and 51b indicate front wheels and rear wheels, respectively.

The electric-powered vehicle E has a main function that the output of the motor 41 or the combustion engine 43 or both of these serving as driving sources is transmitted through the transmission 45 to a pair of the right and left front wheels 51a. Then, the power supply 49 is connected through the inverter 47 to the motor 41.

Further, the electric-powered vehicle E shown in FIG. 5 is provided with a vehicle ECU 53 for performing comprehensive control of the entire electric-powered vehicle E. The vehicle ECU 53 receives driving signals inputted from the electric-powered vehicle E in response to operation of an ignition key 55, an accelerator pedal, a brake, and the like (not illustrated) by a driver or the like. Then, on the basis of the driving signals, the vehicle ECU 53 outputs instruction signals to a combustion engine ECU 57, the power supply 49, and the inverter 47 serving as a load. In response to the instruction signal, the combustion engine ECU 57 controls the revolution speed of the combustion engine 43 and drives the electric-powered vehicle E.

For example, when the inverter D in which the film capacitor B or the connection type capacitor C of the embodiment is employed as the capacitor part 33 is mounted on the electric-powered vehicle E shown in FIG. 5, it is possible to suppress decrease in the electrostatic capacitance in the film capacitor B or the connection type capacitor C even after a self-healing phenomenon has occurred. Thus, current control in the control device such as the ECU mounted on the electric-powered vehicle can be stabilized further.

Here, in addition to the above-mentioned hybrid electric vehicle (HEV), the inverter D of the embodiment may be applied to various power conversion application products such as an electric vehicle (EV), a fuel-cell vehicle, an electric bicycle, an electric generator, and a solar battery.

Next, a method of manufacturing the film capacitor B of the second embodiment employed as an example is described below. First, the organic resin 1a serving as the base material of the dielectric film 1 is prepared. As the organic resin 1a, one of polymer compound selected from a cyclic olefin-based resin, a polyarylate-based resin, a polyphenylene ether-based resin, and a polyetherimide-based resin is preferable. As the solvent used for slurry preparation of the polymer compound, one selected from cyclohexane, ethylcyclohexane, toluene, xylene, chloroform, and tetrahydrofuran is prepared. This solvent becomes the organic component 1b contained in the dielectric film 1.

When the dielectric film 1 is to be formed, for example, a PET film is prepared as a substrate. Then, the above-mentioned polymer compound is dissolved in a particular solvent so as to be prepared into the form of slurry. Then, the slurry is applied onto the PET film into the form of a film. Then, as a result of a drying process at 40 to 180° C. for approximately 1 hour, the dielectric film 1 is obtained. Here, in the film formation, one forming method selected from a doctor blade method, a die coater method, a knife coater method, and the like is employed.

Next, a metallic component such as Al (aluminum) is vapor-deposited on the surface of the obtained dielectric film 1 and thereby the electrode film 3 is formed. Then, two sets of the dielectric films 1 in which the electrode film 3 has been formed are prepared. Then, as shown in FIG. 2, the dielectric films 1 are wound together so that the body portion 13 of the film capacitor B is obtained.

Next, metalicon electrodes serving as the external electrodes 15a and 15b are formed on the end faces of the body portion 13 where the electrode film 3 is exposed. In the formation of the external electrodes 15a and 15b, for example, a metal thermal-spraying method, a sputtering method, a plating method, and otherwise are preferable. Then, the surface of the body portion 13 in which the external electrodes 15a and 15b have been formed is enclosed by an exterior member so that the film capacitor B of the embodiment can be obtained.

The connection type capacitor C can be obtained so that a plurality (four, in the embodiment) of the film capacitors B are aligned and then the bus bars 21 and 23 are attached via a joining material to the external electrodes 15a and 15b formed at both ends of the body portion 13.

Here, in a case where the connection type capacitor C is formed in a resin-molded type, the film capacitors B linked together by employing the bus bars 21 and 23 are put into a case and then the case is filled with resin so that the connection type capacitor C is manufactured.

EXAMPLE

Hereinafter, film capacitors were fabricated and evaluated. First, each organic resin for forming the dielectric film and each solvent serving as the organic component were prepared as shown in Table 1. Here, as the cyclic olefin-based resin, a norbornene-based ring-opening polymer (ZEONOR (registered tradename) 1600 manufactured by Zeon Corporation) and a norbornene-based addition copolymer (TOPAS (registered tradename) 6017 manufactured by Polyplastics Co., Ltd.) were employed. Further, XYRON manufactured by Asahi Kasei Corporation was prepared as the polyphenylene ether-based resin and STM1700 manufactured by SABIC Innovative Plastics was prepared as the polyetherimide-based resin. As the polyarylate-based resin, a polymer compound whose main skeleton was polyester was prepared.

Next, the organic resin and the solvent described above were mixed together so that slurry composed of an organic vehicle in which the organic resin was contained at a fraction of approximately 15 mass % was prepared.

Then, the prepared slurry was applied by using an applicator onto a substrate formed of polyethylene terephthalate (PET). Then, a drying process was performed by using a hot air dryer so that each dielectric film was manufactured. At that time, the drying temperature was changed depending on the sample. The employed temperature was 50° C. or 170° C. The average thickness of the dielectric films was 5 μm.

Aluminum was vapor-deposited onto the surface of the obtained dielectric film so that a metallized film was manufactured. Then, the manufactured metallized films were wound together so that a film capacitor having a cylindrical shape shown in FIG. 2 was manufactured. The size of the manufactured film capacitor was 5 mm in diameter and 100 mm in height. The thickness of the aluminum vapor-deposition film was set to be 50 nm in average.

In the fabricated film capacitor, first, the content of the organic component was measured. As for the content of the organic component, a sample of the dielectric film together with a standard solution was put in a flask so that a measurement solution was prepared. After that, analysis was performed by using a gas chromatograph (GC-14A manufactured by Shimadzu Corporation). Here, in a case of quantitative analysis, xylene or tetrahydrofuran (THF) was employed as the standard solution. As an organic component in the sample, each solvent used for dissolving the organic resin was detected.

Next, in the manufactured film capacitor, in a state where an SH (Self Healing) property which was an evaluation of the self-healing function described below was evaluated, a change ratio of the electrostatic capacitance was measured. Further, the withstand voltage was evaluated. Furthermore, the high-temperature load lifetime was measured.

The SH property was evaluated on the sample manufactured as follows. First, the dielectric film was cut out from the manufactured film capacitor and then processing was performed so that aluminum electrode films having diameters of approximately 50 mm and 38 mm may remain on principal surfaces of the dielectric film, respectively.

As the evaluation apparatus for the SH property, there was employed a direct-current DC high-voltage test machine (manufactured by Kikusui Electronics Corp.) whose electrode system was constructed so that an electrode plate provided with a ring-shaped guard electrode having an outer shape of 50 mm and an inner diameter of 39 mm and with a main electrode having a circular outer shape of 38 mm installed on the inner side thereof was disposed so as to oppose an opposite electrode plate having a diameter of 50 mm.

In this case, the metallized film was pinched so that the electrode film having a diameter of 38 mm was located on the electrode plate side where the ring-shaped guard electrode and the main electrode were provided and the electrode film having a diameter of 50 mm was located on the opposite electrode plate side whose diameter was 50 mm. These electrode films, the electrode plate, and the opposite electrode plate were disposed so that the center axes may be aligned to each other.

In the evaluation of the SH property, in the direct-current voltage test machine, voltage boost was performed at a voltage boost rate of 100 V/second up to a limit point where an excessive current has flowed so that the voltage boost was stopped. After the limit point has been reached, the voltage was return to 0 V and then voltage boost was performed again. In this case, when a voltage rise was obtained, voltage boost was continued and similar operation was repeated so that the number of times was counted until the voltage boost became unachievable. When the number of times was 3 or greater, the SH property was concluded as satisfactory and the evaluation was marked with "Good" in Table 1. When the number of times was 1 or 2, the evaluation was marked with "Not bad". When the number of times was 0, the evaluation was marked with "Bad". Further, before and after the evaluation of the SH property, the electrostatic capacimay have an area of 1.5×1.5 mm². In the test, the manufactured sample was put in a high temperature chamber at 110° C. and then left still for 90 minutes. After that, in the direct-current voltage test machine, voltage boost was performed at a voltage boost rate of 100 V/second up to a predetermined electric field. Then, the time to a breakage (a short circuit) after the predetermined electric field has been reached (the first time of breakage) was adopted as the lifetime.

As the organic resin of comparison examples, polyethylene terephthalate (Lumilar manufactured by Toray Industries, Inc.) and polypropylene (Torayfan manufactured by Toray Industries, Inc.) were prepared and then samples were manufactured and evaluated similarly.

TABLE 1

| | Organic resin | | | Organic component | | | Withstand voltage V/μm | SH property | Electrostatic capacitance change ratio % | Lifetime* Electric field V | $\varepsilon \times DE^2$ $V^2$ | Time h |
|---|---|---|---|---|---|---|---|---|---|---|---|---|
| Sample No. | Type | Tg ° C. | ε | Type | Tb ° C. | Content mass % | | | | | | |
| 1 | Polyethylene terephthalate | 69 | 3.2 | None | | | 508 | Good | 11 | 405 | 5.25E+05 | 0.7 |
| 2 | Polypropylene | 0 | 2.1 | None | | | 642 | Good | 12 | 500 | 5.25E+05 | 0.7 |
| 3 | Cyclic olefin-based resin (Ring opening polymer) | | | Tetrahydrofuran | 66 | 0.05 | 661 | Not bad | 3 | 478 | 5.26E+05 | 1 |
| 4 | | | | Tetrahydrofuran | 66 | 0.1 | 726 | Good | 4 | 478 | 5.26E+05 | 1.8 |
| 5 | | | | Cyclohexane | 81 | 7 | 732 | Good | 5 | 478 | 5.26E+05 | 2 |
| 6 | | 163 | 2.3 | Ethyl cyclohexane | 132 | 3 | 719 | Good | 7 | 478 | 5.26E+05 | 1.7 |
| 7 | | | | Toluene | 111 | 1.5 | 734 | Good | 6 | 478 | 5.26E+05 | 2.4 |
| 8 | | | | Xylene | 144 | 2 | 710 | Good | 8 | 478 | 5.26E+05 | 0.2 |
| 9 | | | | Decahydronaphthalene | 186 | 8 | 501 | Bad | 9 | 478 | 5.26E+05 | 0.7 |
| 10 | | | | Cyclohexane + Toluene | 81-111 | 2.5 | 758 | Good | 5 | 478 | 5.26E+05 | 2.5 |
| 11 | Cyclic olefin-based resin (Addition copolymer) | 178 | 2.3 | Ethylcyclohexane | 132 | 1.2 | 706 | Good | 7 | 478 | 5.26E+05 | 0.16 |
| 12 | Polyarylate | | | Toluene | 111 | 0.01 | 440 | Good | 5 | 405 | 5.25E+05 | 15 |
| 13 | | | | Toluene | 111 | 5 | 450 | Good | 4 | 405 | 5.25E+05 | 18 |
| 14 | | 220 | 3.2 | Tetrahydrofuran | 66 | 2 | 470 | Good | 4 | 405 | 5.25E+05 | 18.5 |
| 15 | | | | Chloroform | 61 | 1 | 450 | Good | 3 | 405 | 5.25E+05 | 9.5 |
| 16 | | | | NMP | 202 | 2 | 480 | Good | 2 | 405 | 5.25E+05 | 18 |
| 17 | Polyphenylene ether | 210 | 2.6 | Chloroform | 61.2 | 0.01 | 690 | Good | 8 | 449 | 5.24E+05 | 3 |
| 18 | | | | Chloroform | 61.2 | 1 | 700 | Good | 8 | 449 | 5.24E+05 | 3.4 |
| 19 | Polyetherimide | 200 | 3 | Chloroform | 61.2 | 0.01 | 500 | Good | 4 | 418 | 5.24E+05 | 0.8 |
| 20 | | | | Chloroform | 61.2 | 1 | 510 | Good | 4 | 418 | 5.24E+05 | 1.1 |

*ε: Relative permittivity, DE: Breakdown voltage tance was measured at a frequency of 1 kHz and a voltage of 1 V by using an LCR meter and then the change ratio (Cv) was acquired by the following formula. In this case, the change ratio of the electrostatic capacitance was recognized in the form of absolute value. In a case where the electrostatic capacitance prior to the evaluation of the SH property is denoted by $C_0$ and the electrostatic capacitance posterior to the evaluation of the SH property is denoted by Cs, the formula for calculating the change ratio (Cv) is $Cv=(Cs-C_0)\times 100/C_0$.

Further, the withstand voltage was measured for the manufactured film capacitor. The withstand voltage was acquired from the voltage at the time when the leakage current has reached 0.5 A which was measured by using an insulation resistance tester.

In the test for the high-temperature load lifetime, a metallized film cut out from the film capacitor was employed as the measurement sample. The size of the sample was processed so that the capacitance formation part In each of the sample Nos. 3 to 11 in which the cyclic olefin-based resin was employed as the organic resin of the dielectric film and the organic component was contained, the change ratio of the electrostatic capacitance before and after the SH property evaluation was 9% or smaller.

Among these samples, in each of the sample Nos. 4 to 8, 10, and 11 whose content of the organic component was 0.1 to 7 mass %, the SH property evaluation has cleared the criterion "3 times". Further, the withstand voltage was 706 V/μm or higher.

Further, in each of the samples in which either cyclohexane or toluene was contained as the organic component (sample Nos. 5, 7, and 10), the withstand voltage was 732 V/μm or higher.

Further, also in each of the samples in which any one of the polyarylate-based resin, the polyphenylene ether-based resin, and the polyetherimide-based resin was employed as the organic resin of the dielectric film (sample Nos. 12 to 20), it has been confirmed that the organic component within a range of 0.01 to 5 mass % was contained in the dielectric film. However, also in these samples, the change ratio of the electrostatic capacitance before and after the SH property evaluation was as low as 8% or smaller.

Among these samples, in each of the samples in which the polyarylate-based resin was employed as the organic resin of the dielectric film (sample Nos. 12 to 16), the high-temperature load lifetime was as excellent as 9.5 hours or longer.

Figure 6:
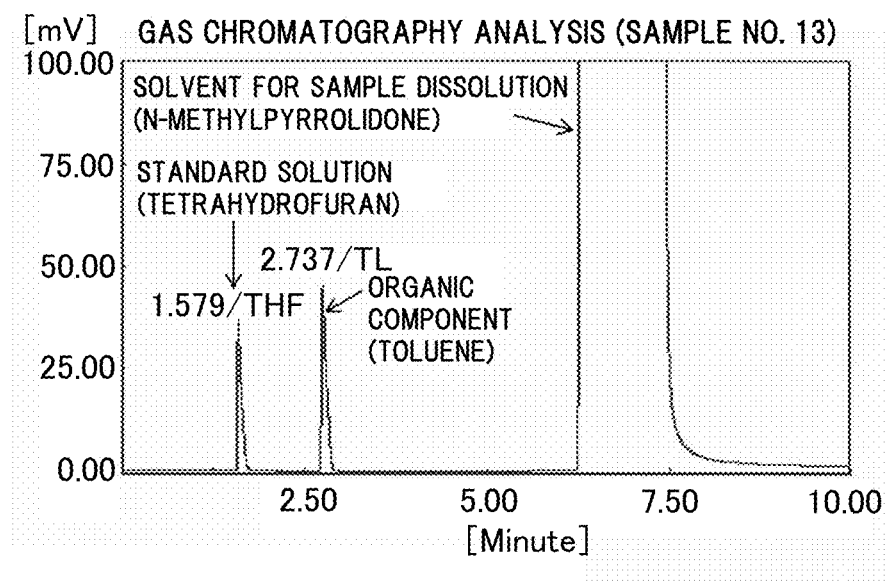
FIG. 6 shows a result of gas chromatography analysis of a sample No. 13 in an example.

FIG. 6 shows the result of gas chromatography analysis of the sample No. 13. An organic component (toluene) of the same kind as the solvent used in the dielectric film has been detected.

In contrast, in each of the samples in which the organic component is not contained in the dielectric film (sample Nos. 1 and 2), the change ratio of the electrostatic capacitance before and after the SH property evaluation was 11% or greater.

REFERENCE SIGNS LIST

A, B: Film capacitor
C: Connection type capacitor
D: Inverter
E: Electric-powered vehicle
1, 17a, 17b: Dielectric film
1a: Organic resin
1b: Organic component
3, 19a, 19b: Electrode film
5, 11a, 11b: Metallized film
6: Body portion
7, 15a, 15b: External electrode
9: Lead wire
10: Exterior member
21, 23: Bus bar
31: Bridge circuit
33: Capacitor part
35: Booster circuit
41: Motor
43: Combustion engine
45: Transmission
47: Inverter
49: Power supply
51a: Front wheel
51b: Rear wheel
53: Vehicle ECU
55: Ignition key
57: Combustion engine ECU

The invention claimed is:

1. A film capacitor, comprising:
a dielectric film; and
an electrode film disposed on a principal surface of the dielectric film,
the dielectric film containing an organic resin and an organic component having a higher volatility than the organic resin,
the organic resin being any one of a cyclic olefin-based resin, a polyarylate resin, a polyphenylene ether resin and a polyetherimide resin,
the organic component containing any one of cyclohexane, ethylcyclohexane, toluene, xylene, tetrahydrofuran, and n-methylpyrrolidone, chloroform, and a mixture of cyclohexane and toluene,
a content of the organic component contained in the dielectric film being 0.01 to 7 mass %.

2. The film capacitor according to claim 1, wherein the organic resin is the cyclic olefin-based resin, and the cyclic olefin-based resin is a ring-opening polymer or an addition copolymer.

3. The film capacitor according to claim 1, wherein the organic resin is the cyclic olefin-based resin, and the organic component is any one of cyclohexane, ethylcyclohexane, toluene, xylene, and a mixture of cyclohexane and toluene.

4. The film capacitor according to claim 1, wherein the organic resin is the polyarylate resin, and the organic component is any one of toluene, tetrahydrofuran, and n-methylpyrrolidone.

5. The film capacitor according to claim 1, wherein the organic resin is the polyphenylene ether resin or a polyetherimide resin, and the organic component is the chloroform.

6. The film capacitor according to claim 5, wherein the organic resin is the polyetherimide resin, and the organic component is chloroform.

7. A connection type capacitor, comprising:
a plurality of film capacitors, the film capacitors each including:
a dielectric film, and
an electrode film disposed on a principal surface of the dielectric film,
the dielectric film containing an organic resin and an organic component having a higher volatility than the organic resin,
the organic resin being any one of a cyclic olefin-based resin, a polyarylate resin, a polyphenylene ether resin and a polyetherimide resin,
the organic component containing any one of cyclohexane, ethylcyclohexane, toluene, xylene, tetrahydrofuran, and n-methylpyrrolidone, chloroform, and a mixture of cyclohexane and toluene,
a content of the organic component contained in the dielectric film being 0.01 to 7 mass %; and
a bus bar connecting the plurality of the film capacitors.

8. An inverter, comprising:
a bridge circuit composed of switching elements; and
a capacitor part connected to the bridge circuit,
the capacitor part being composed of a film capacitor, the film capacitor including:
a dielectric film, and
an electrode film disposed on a principal surface of the dielectric film,
the dielectric film containing an organic resin and an organic component having a higher volatility than the organic resin,
the organic resin being any one of a cyclic olefin-based resin, a polyarylate resin, a polyphenylene ether resin and a polyetherimide resin,
the organic component containing any one of cyclohexane, ethylcyclohexane, toluene, xylene, tetrahydrofuran, and n-methylpyrrolidone, chloroform, and a mixture of cyclohexane and toluene,
a content of the organic component contained in the dielectric film being 0.01 to 7 mass %.

9. An electric-powered vehicle, comprising:
a power supply;
an inverter connected to the power supply, the invertor including:
a bridge circuit composed of switching elements, and
a capacitor part connected to the bridge circuit,
the capacitor part being composed of a film capacitor, the film capacitors including:
   a dielectric film, and
   an electrode film disposed on a principal surface of the dielectric film,
   the dielectric film containing an organic resin and an organic component having a higher volatility than the organic resin,
   the organic resin being any one of a cyclic olefin-based resin, a polyarylate resin, a polyphenylene ether resin and a polyetherimide resin,
   the organic component containing any one of cyclohexane, ethylcyclohexane, toluene, xylene, tetrahydrofuran, and n-methylpyrrolidone, chloroform, and a mixture of cyclohexane and toluene,
   a content of the organic component contained in the dielectric film being 0.01 to 7 mass %;
a motor connected to the inverter; and
wheels driven by the motor.

* * * * *